Patented June 12, 1945

2,378,307

UNITED STATES PATENT OFFICE 2,378,307

PROCESS FOR EXCHANGING CATIONS FROM AQUEOUS SOLUTIONS

Otto Liebknecht, Neubabelsberg, near Berlin, Germany, assignor to The Permutit Company, New York, N. Y., a corporation of Delaware No Drawing. Application April 5, 1938, Serial No. 200,243. In Germany April 20, 1937

4 Claims. (Cl. 210—24)

This invention or discovery relates to the manufacture of carbonaceous zeolites; and it comprises an improvement in the manufacture of ion exchanging carbon materials, or carbonaceous zeolites, by the action of sulfuric acid on carbonaceous materials with limitation of the amount of actual carbon formed in the action wherein the sulfuric acid used already contains dissolved carbon compounds, the material treated advantageously also containing sulfur oxides in organic combination, as with dried sulfite waste liquor; all as more fully hereinafter set forth and as claimed.

In a prior and copending application Serial No. 10,127, filed March 6, 1935, wherewith the present application contains certain matter in common, I have described and claimed active ion exchanging bodies made by the treatment of various materials, notably lignite, bituminous coal and similar materials, with strong sulfuric acids or a sulfonating body such as chlor-sulfonic acid and $SO_3$ gas. The actions are to a large extent unknown but they involve sulfonation or sulfation; $SO_3$ going into organic combination. One undesirable action is charring with production of carbon as such. This, to a certain extent, is inevitable but it is not desirable. The products of the sulfating action, after washing free of solubles, are highly insoluble and of an acidic nature and can be used in purifying water in a way analogous to that with ordinary silicate zeolites, glauconite, etc., being alternately contacted with flowing water and regenerated with a salt solution. They have, however, a considerably greater capacity, both per unit volume and unit weight. They have the further great advantage over silicate zeolites in that they can be regenerated an indefinite number of times with acids without injury. This makes practicable their use in removing cations from water and substituting hydrogen therefor in the water. Hard water containing calcium and magnesium salts can have the cations removed with carbonaceous zeolites leaving the corresponding acid in solution. Where the acid is carbonic acid, it can afterwards be removed by aeration.

The actions of sulfuric acid and of $SO_3$ gas in treating lignite, soft coal and other materials are complex and somewhat difficult to control. In particular, insofar as the charring action is exerted, there is a production of elemental carbon which is of no great value for the purposes of these preparations. Charring is due in part to the withdrawal of water from carbohydrates. This charring difficulty is one of the reasons for preferring the use of lignite and soft coal to ordinary vegetable materials such as wood chips, etc. The action is less violent with lignite and coal.

In making good ion exchange material, a strength of acid of at least 70 per cent is advantageous and $SO_3$ is often desirable, since the reaction can be easily controlled. In the latter event the $SO_3$ is used as a vapor, advantageously diluted somewhat with inert gases.

I have now discovered that by the use of sulfuric acid, already mixed or combined with carbon compounds, better ion exchanging bodies are produced. The carbon compounds associated with the acid no doubt contribute to the product. The action is considerably less violent and higher heats are easily avoided. There is much less charring with production of elemental carbon as an inert constituent if heating is properly controlled.

Acidic substances of the character I desire may be made by treating sulfuric acid with a petroleum oil until the first energetic reaction is over. A sludge forms and settles to the bottom. Excess oil, if any, in the sludge may then be removed or allowed to remain. However, waste acids of a character suitable for my purposes are available in many industries and particularly in petroleum refining. Most petroleum products are "treated" with sulfuric acid at one stage or another and there is an accumulation of separated acid sludge. The acid used is ordinarily of a strength not less than 66° Bé. (93–97 per cent $H_2SO_4$) and it is often fuming acid; that is, $H_2SO_4$ containing $SO_3$ in large amount. The sludge is generally of fluent character, sometimes being quite liquid, and contains free and combined sulfuric acid, asphaltic matter, neutral oil and miscellaneous compounds. Such an acid sludge is, according to one embodiment of the invention, caused to act upon a suitable carbonaceous material, at a suitable elevated temperature. Among suitable carbonaceous materials are bituminous coal, anthracite, semi-coke, pitch, lignite, peat, charcoal, cork, wood, straw, sugar, dextrine, and other carbonizable substances, or substances containing carbonizable constituents, exemplified by soaps, concentrated or thickened sulfite waste liquor, fats and fatty acids, various organic acids and their salts; or mixtures of these materials.

Of these carbonaceous materials, thickened or dried sulfite waste liquor is particularly useful. This already contains sulfur acids in organic combination; the characteristic ingredients being generally called "ligno-sulfonic acids", although they are not formed with the aid of sulfuric acid.

In bringing about reaction between the acid sludge and the carbonaceous material, these substances are mixed and are heated at temperatures of about 90° to 250° C., the temperature being controlled so as to yield insoluble products of the character desired, but to avoid any extensive carbonization or coking of the reaction mixture.

In some cases higher concentrations of acid are desirable than those obtained from acid sludge. In such cases, additional quantities of concentrated acid are added to the sludge or the reaction mixture. The added acid can be concentrated sulfuric acid, or other acids such as chlorsulfonic acid and fuming sulfuric acid, or acid anhydrides such as sulfuric anhydride or phosphoric anhydride. Using sulfuric anhydride, i. e. $SO_3$ (sulfur trioxide), this is best employed as a vapor, and in conjunction with inert diluent gases.

As a rule, the process works best when the acid concentration of the sludge or the sludge and acid mixture, is at least 70 per cent $H_2SO_4$.

It has been discovered by another that in the production of ion-exchange substances from coal, etc., with the acid of sulfuric acid, better products are obtained when an oxidation promoting agent is present. This expedient is also useful in the present invention. Products of 20 to 40 per cent better exchange capacity are obtained when there is added to the reagents, either before or during the heat treatment, a suitable quantity of an oxidation promoting agent, for example nitric acid of 86 per cent strength (at which concentration it can be mixed with concentrated sulfuric acid without development of heat), chromic acid, permanganates and persulfates, and certain anhydrous salts of chromium, aluminum, manganese, cobalt, nickel and iron. These materials can be added at any stage in the process, but their effect is greatest when they are present during the heat treatment.

In the oil refining art, the acid sludge obtained as described is usually processed for recovery of sulfuric acid therefrom. This involves diluting the sludge with water, whereupon oil and lighter tarry matters, etc., are separated as a layer overlying a layer of impure dilute sulfuric acid. The decanted sulfuric acid (sludge acid) is then usually concentrated by evaporation, and the product is a fairly concentrated but impure product known as black acid.

These impure sulfuric acids separated from acid sludge contain substantial quantities of soluble organic compounds, and are useful in my process. Concentrated to 70 per cent or higher $H_2SO_4$, they can be used to treat coal or other carbonaceous substances, to secure better products than are obtainable with pure sulfuric acid. The acid obtained by dilution of acid sludge may be used with advantage in the processes of my copending application Serial No. 10,127 where sulfuric acid is indicated. A better product is obtained using this type of acid which is, so to speak, buffered against violent action by the contained carbon compound.

With proper control of conditions, the reaction products are usually of excellent physical character, being readily prepared as uniform granules of the right degree of porosity and size and having good resistance to wear and abrasion. However, it is sometimes advantageous to incorporate the reaction products in or on inactive carrier bodies, such as burnt clay granules. The granules can be added before, during or after the heat treatment, depending on the character of the reacting substances.

In a modification of the invention, excellent ion exchange bodies are made by treatment of acid sludge alone; the sludge supplying both the carbonaceous component and the acidic component. If heating of an acid sludge be conducted at a temperature of 90° to 100° C., after or before concentration, $SO_2$ is given off. Evolution is more active at higher temperatures. By continuing the heating until a sample on admixture with water no longer gives up color and there is no separation of oil, an active ion exchanging body is produced. This may be granulated, washed and used for treating water, either as a sodium zeolite or as a hydrogen zeolite. While higher and lower temperatures of reaction may be used, in a general way temperatures between 90° and 100° C. are best. However, good products may be obtained by heating up to 250° C. Higher temperatures resulting in extensive coking are not desirable.

Following are three specific examples of processes within the purview of the invention, directed to making cation-exchanging substances from acid sludge alone.

*Example 1.*—An acid sludge derived from a petroleum works is slowly heated while being stirred. At about 85° C. a plainly perceptible odor of $SO_2$ arises. The temperature is then slowly increased and the $SO_2$ development becomes more active. Any sudden foaming of the mass is prevented by stirring. When the temperature is increased to about 160°, a point is reached where the development of sulphurous acid seems to decrease, whereupon one determines by mixing a sample with water whether the conversion process is complete. The mass is now diluted with water and the active substance, which looks something like coal, is separated from the sulfuric acid by filtration. The sulfuric acid can be concentrated and used again. The sulfur dioxide given off can also be made use of so that no appreciable loss in sulfuric acid results.

If desired, the temperature can be kept at a lower point, for example at 130°, in which case the development of $SO_2$ and the conversion to the desired substances take more time. The temperature can likewise be maintained at a higher value, up to the limit set forth. Correspondingly shorter periods of reaction result.

*Example 2.*—A batch of 500 parts by weight of acid sludge with a specific gravity of about 1.69 is heated slowly and stirred, until a temperature of about 160° is reached. $SO_2$ development begins at about 80° during the heat treatment, and becomes more and more active as the temperature rises to about 100°. The heat treatment is carried on for about 1.5 hours, during which period the temperature is kept at 160° C. for about a half hour. A sample is now taken and is diluted with water. Should this sample still show that conversion is not complete, the heat treatment is continued for some time longer. In general, however, the above stated time suffices for completion. Now the whole mass is cooled and immersed in water and the sulfuric acid is separated from the coallike active substance present in the water. About 54 parts by weight (air dried) of this carbonaceous substance are obtained. The filtrate consisting of sulfuric acid can be reconverted into sulfuric acid of the desired strength by evaporative concentration, in connection with which the concentration of the sulfuric acid is increased as much as possible by systematic leaching.

*Example 3.*—Petroleum refining sludge is diluted to produce a 70 per cent acid and the oily separation removed. About 50 parts of granulated commercial soft coal or lignite with not more than 15 per cent water are mixed into 200 parts of the acid so obtained. Stirring cold, during mixture, the temperature rises to 70-80° C. The mixture is agitated and heated until 150° C. is reached which may take a quarter hour. The residual acid is separated from the treated granulated coal and the granules washed with water to approximate neutrality.

The products resulting from the processes of Examples 1, 2 and 3 are characterized by having excellent mechanical properties, and good cation exchange power compared with other carbonaceous zeolites.

The granular products of the various processes described may be employed in purifying water. On flowing hard water in contact with extensive surfaces of these granules, the cations are removed. The carbonaceous zeolite can then be regenerated either with salt or with dilute acid, say 3 per cent sulfuric acid. In the former case, on re-use of the zeolite with hard water, there is an ion exchange, sodium being exchanged for the calcium and magnesium of the hard water. The material is an excellent ion exchanger and has the merit of having greater capacity or longer life between regenerations. If regeneration is with dilute acid, then the zeolite extracts cations such as calcium, magnesium and sodium, substituting hydrogen therefor. This leaves the effluent from the exchanger of acid nature. Insofar as acidity is due to $CO_2$ it can be removed by aeration and in other well known ways. Insofar as acidity is due to mineral acids, sulfuric and hydrochloric, it can be neutralized by an addition of the proper amount of water softened by ion exchange and containing soda. Or, the free acids may be removed by the use of special carbonaceous zeolites adapted to extract anions from flowing water.

While treatment times and temperatures vary with the materials treated, the simple test given is a good guide for ascertaining the optimum conditions. That is, when a sample of the reaction mixture is immersed in water, and gives up no coloring matter, etc., to the water, this is an indication that conversion is complete for the present purposes.

What I claim is:

1. A process for effecting cation exchange in liquids which comprises contacting said liquids with a sulfated asphaltic material.

2. A process for reducing temporary hardness in liquids which comprises contacting said liquids with a sulfated asphaltic material.

3. A process for exchanging cations from aqueous solutions and effecting regeneration of the cation exchange medium, comprising first effecting exchange of cations with a sulfated asphaltic material, and thereafter regenerating said sulfated asphaltic material by treatment with a different cation containing liquid.

4. A process for recovering cations from aqueous solutions and effecting regeneration of the cation exchange medium, comprising first effecting exchange of cations with a sulfated asphaltic material, thereafter regenerating said sulfated asphaltic material by treatment with a different cation containing liquid, and recovering the originally exchanged cations from the effluent of the regeneration treatment.

OTTO LIEBKNECHT.